United States Patent [19]

Koval et al.

[11] Patent Number: 4,505,338

[45] Date of Patent: Mar. 19, 1985

[54] TURF CONDITIONING APPARATUS

[75] Inventors: Alexander Koval, Endwell, N.Y.; H. Donald Whitlow, Anniston, Ala.

[73] Assignee: Blue Mountain Industries, Blue Mountain, Ala.

[21] Appl. No.: 487,806

[22] Filed: Apr. 22, 1983

[51] Int. Cl.$^3$ .............................................. A01B 31/00
[52] U.S. Cl. ...................................... 172/611; 172/612
[58] Field of Search ...................... 172/189, 612, 611; 37/219, 221, 222

[56] References Cited

U.S. PATENT DOCUMENTS

| | | | |
|---|---|---|---|
| 951,297 | 3/1910 | Wilding | 172/611 X |
| 1,245,431 | 11/1917 | Boyd | 172/189 |
| 1,350,512 | 8/1920 | Mowatt | 172/611 |
| 1,472,949 | 11/1923 | Tucker | 172/612 |
| 1,530,329 | 3/1925 | Roberts | 172/612 |
| 1,786,194 | 12/1930 | Dickinson | 172/612 |
| 2,718,730 | 9/1955 | Brazeau | 172/612 X |
| 3,613,802 | 10/1971 | Carlson | 172/197 |
| 3,954,499 | 5/1976 | Canto | 172/612 X |

FOREIGN PATENT DOCUMENTS

| | | | |
|---|---|---|---|
| 104942 | 9/1938 | Australia | 172/612 |
| 2818359 | 11/1979 | Fed. Rep. of Germany | 172/612 |

Primary Examiner—Richard T. Stouffer
Attorney, Agent, or Firm—Jones & Askew

[57] ABSTRACT

A turf conditioning apparatus includes a supporting bar suitably attached to a commercial tractor-mower and a netting suspended from it so as to engage the ground surface immediately after the tractor-mower. A chain or like weighted member is attached to and extends across the width of the netting to insure engagement of the remaining rearward portion of the netting with the ground. Conventional operation of the tractor-mower causes the netting to be dragged across the ground surface and thereby condition same.

5 Claims, 3 Drawing Figures

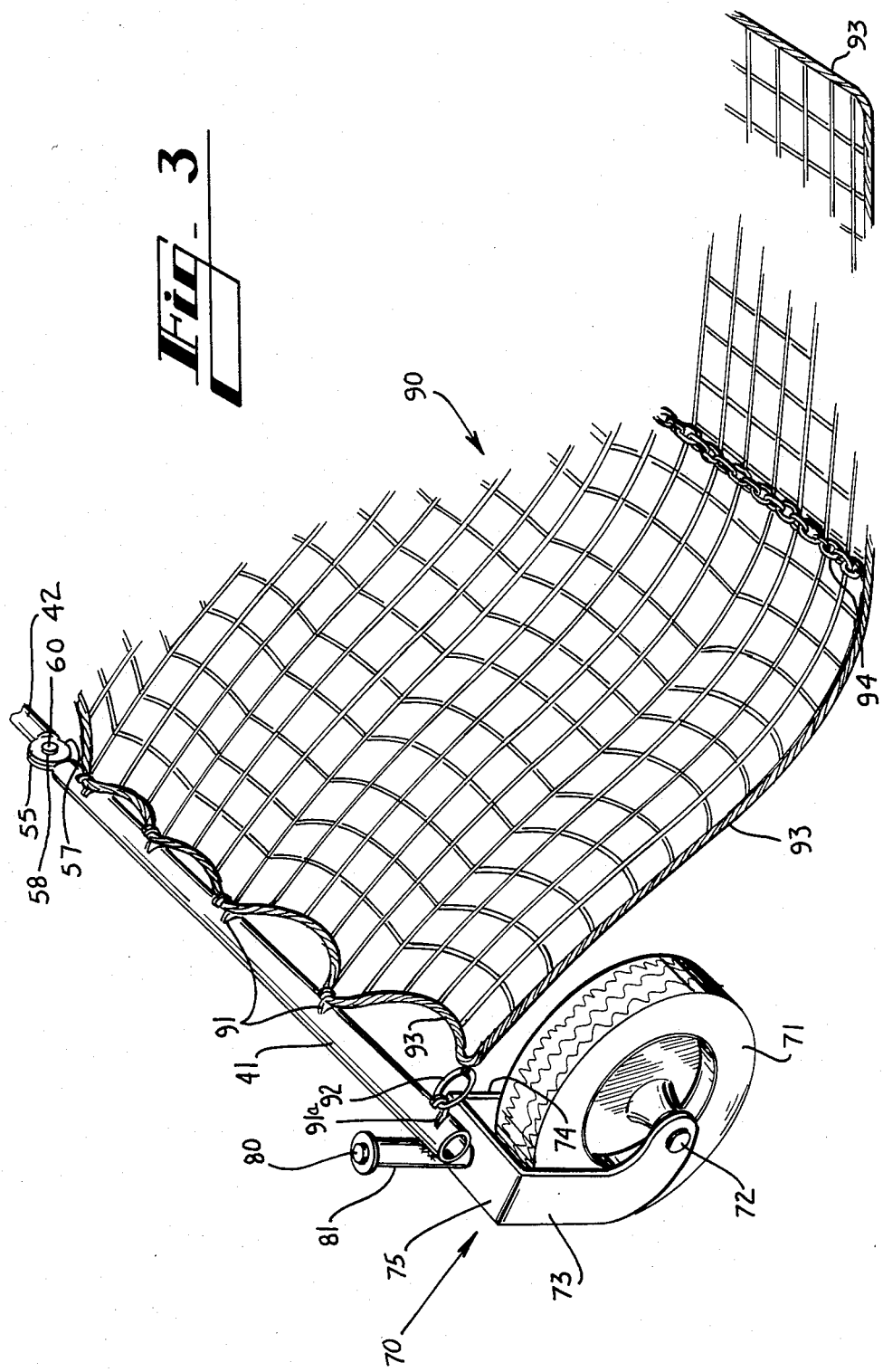

TURF CONDITIONING APPARATUS

TECHNICAL FIELD

The present invention relates to landscaping and ground surface maintenance, and more particularly relates to an apparatus for the conditioning of a freshly mowed lawn surface such as a fairway of a golf course.

BACKGROUND OF THE INVENTION

Golf has long been recognized as a demanding sport, due in part to the many variables which the golfer must consider. One such variable is the playing surface, and in particular, that area known as the "fairway". The fairway is to be distinguished from the "rough" and other hazard areas in that it is a carefully manicured lawn section which, in theory, provides a golfer the best possible surface from which to play a shot to the green. The ideal fairway surface comprises a firm ground surface to support the golfer in his or her stance and a smooth, uninterrupted grass surface to support the ball up off the ground surface thereby to permit the golfer to make a proper swing. Thus, it is desirable that the fairway, even though having various contours, provide a consistant grass surface.

Unfortunately, this is often not the case for several reasons. A properly maintained fairway must be mowed frequently. Fairway mowing is typically performed by commercial tractor mowers of such weight as to mat and/or clump the grass cuttings into the grass surface, and form depressions in both the grass surface and the ground surface. Moreover, dew or other surface moisture often causes newly mown grass to collect in clumps, preventing fairway mowing early in the morning or during the night when the golf course normally is not in use. These problems are compounded by golf carts and other maintenance vehicles and equipment frequently driven on the fairway.

Yet another problem is the taking of a "divot", or in other words, the removal of a section of turf as the result of hitting a golf ball with a golf club. Divots, which are a result of normal play, represent further interruptions of the playing surface, each of which affects the quality and enjoyment of the game. Of course, each of these problems are detrimental to the general health of both the ground and grass surface of the fairway.

Two techniques have been tried to reduce clumping of freshly cut grass. Both techniques are intensive users of labor, equipment, and fuel, and one can actually damage the fairway.

The first such known technique calls for traversing the newly-cut fairway with a hose or chain stretched between two tractors to break clumps of grass. This is a separate operation, occuring after mowing and thus requiring the added fuel and operator time for two additional traverses along the fairway. The second known technique calls for towing a length of chain link fencing across the fairway, after cutting the grass, again requiring further labor and fuel. Contact with the grass is not uniform with this technique, resulting in irregular coverage. Moreover, the weight and coefficient of friction of the fencing can damage the grass blades, and the fence method has been known to gauge the turf, completely removing the grass.

No device in the prior art has proven suitable to assist a grounds keeper in these concerns. In fact, golfers have devised what are known as "Winter Rules", whereby relocation of a golf ball from a section of poorly conditioned fairway may be done without penalty so as to permit a proper stance and swing.

SUMMARY OF THE INVENTION

The present invention solves the above-described problems in the prior art by providing a turf conditioning apparatus that promotes a healthy and uninterrupted ground and grass surface, and in particular prevents matting or clumping of grass cuttings on the fairway.

Generally described, the turf conditioning apparatus of the present invention comprises a supporting bar suitably attached to a commercial tractor mower, and a flexible netting carried by the supporting bar so as to extend fully behind the tractor mower to thereby condition both the ground and the grass surface. The present apparatus preferably is used when the grass is being cut, with the same operator and tractor that is cutting the grass.

Described somewhat more particularly, the preferred embodiment of the present invention comprises a supporting bar having three sections, with the middle section suitably attached to the rear portion of a commercial tractor mower and the two end sections pivotally mounted thereto so as to float independently of the center section. The netting is suspended by the supporting bar in such a manner as to be maintained in an extended form behind the mower. The pivotal mounting of the end sections provides for the netting to float across the various contours of the fairway so as to provide a constant playing surface.

Thus, it is an object of the present invention to provide an improved turf conditioning apparatus.

It is another object of the present invention to provide a turf conditioning apparatus that promotes a constant, uninterrupted fairway surface.

It is a further object of the present invention to provide a turf conditioning apparatus that prevents grass cuttings from becoming matted or clumped onto a fairway.

It is a yet further object of the present invention to provide a turf conditioning apparatus that distributes grass cuttings evenly across a fairway.

It is a yet further object of the present invention to provide a turf conditioning apparatus that promotes a healthy ground and grass surface.

It is a yet further object of the present invention to provide a turf conditioning apparatus that so conditions a fairway as to provide a pleasing aesthetic appearance thereto.

Other objects, features and advantages of the present invention will become apparent from reading the following specification in conjunction with the accompanying drawing.

BRIEF DESCRIPTION OF THE DRAWINGS

FIG. 1 is a pictorial view of an embodiment of the turf conditioning apparatus according to the present invention, showing the apparatus mounted to the rear end of a commercial tractor mower suitable for the mowing of a fairway or the like.

FIG. 3 is a fragmentary pictorial view of the embodiment shown in FIG. 1, showing the left-side of the disclosed turf conditioning apparatus.

DETAILED DESCRIPTION

Figure 1:
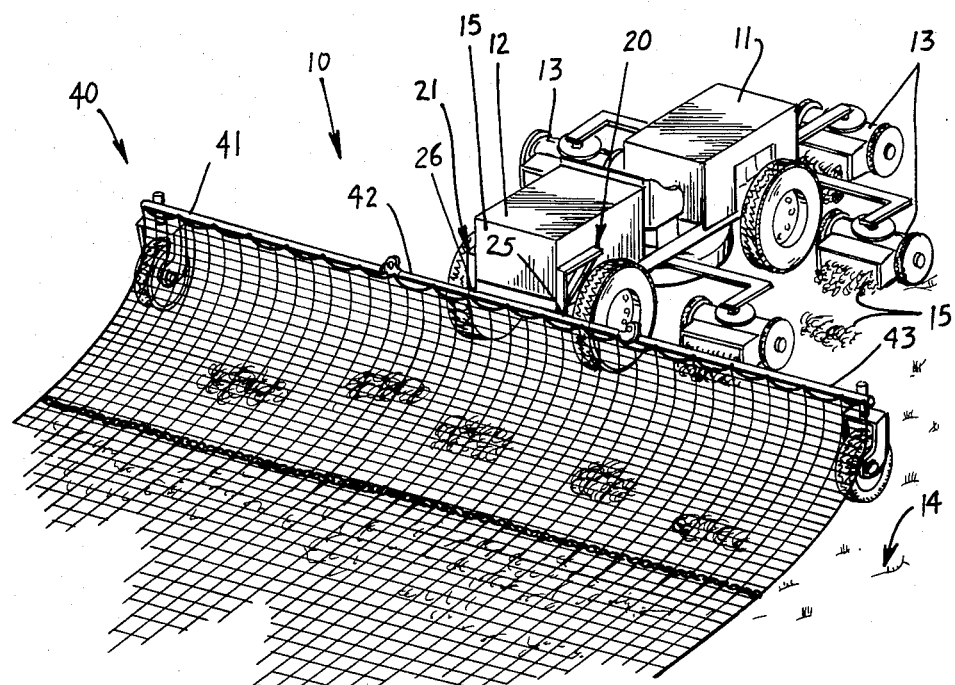

Referring now in more detail to the drawing, in which like numerals indicate like parts throughout the several views, FIG. 1 shows a commercial tractor mower 11 having a rear section 12 and a plurality of rotating cutting blade assemblies 13. In typical golf course use, the tractor mower 11 is driven across a fairway 14 so as to engage and cut the grassy surface thereof. The fairway 14 comprises that portion of a golf hole located between the "tee" and the "green", and excludes the rough, any trees or hazards. The grass surface of a fairway is cut to a relatively short, uniform length, and conventional operation of a tractor mower 11 results in grass cuttings 15 being distributed behind the path of such tractor mower.

The present embodiment in FIG. 1 shows a turf conditioning apparatus 10 mounted upon the rear section 12 of a commercial tractor lawn mower 11 by two interconnecting members 20 and 21. These two members 20 and 21, although attached on opposite sides of the rear section 12 of the mower 11, are otherwise identical and thus, only one will be described in detail. Interconnecting member 20 is comprised of a vertical extension 22, a horizontal extension 23 secured to the uppermost portion of the vertical extension and extending laterally forward therefrom to make a somewhat inverted L-shaped structure, and a support member 24 extending between the horizontal extension and the vertical extention. The interconnecting member 20 may therefore comprise an angle iron and is bolted or otherwise secured to the rear section 12 of the mower 11 in any usual and well known manner.

The present turf conditioning apparatus 10 further comprises a supporting bar 40 having three sections, a left end section 41, a center section 42, and a right end section 43. The center section 42 is fixedly attached to the lowermost portion of vertical extensions 22 of the interconnecting members 20 and 21. In the preferred embodiment, the center section 42 of the supporting bar is welded (shown at 25 in FIG. 1) to the lowermost portions of the vertical extensions 22 of interconnecting members 20 and 21. However, any means of fixedly attaching the center section 42 of the supporting bar 40 to the rear portion 12 of the tractor mower 11 so as to maintain the center section in a horizontal position relative to the plane of the horizon is suitable for practice of the present invention.

The left end section 41 and the right end section 43 of the supporting bar 40 are pivotably mounted to the center section 42 as described in detail hereinbelow. Since the left end section 41 is the mirrored duplicate of the right end section 43, only one is described herein in detail.

The left end section 41 is pivotably mounted to the center section 42. As best shown in FIG. 3, the rightmost portion of the left end section 41 comprises a circular or disk-like extension 55 having an aperture 56 (not shown) at the center of the disk-like extension. The leftmost portion of the center section 42 also comprises a disk-like extension 57 also having an aperture 58 at the center thereof. It is to be understood that the disk-like sections 55 and 57 are to be brought into intimate contact and therefore, the preferred disk-like extensions are of substantially identical shape and size having apertures 56 and 58, respectively, positioned so as to facilitate alignment thereof. Thus, when so aligned, apertures 56 and 58 form an elongated aperture through which a pin 60 extends. Pin 60 therefore comprises an axis about which the left end section 41 freely pivots relative to the center section 42. Even so, it is to be understood that the preferred construction of the supporting bar 40 is substantially rigid in the direction of movement of the tractor mower 11. Thus, it will be appreciated by one skilled in the art that the left end extension 41 pivots about pin 60 in a substantially vertical plane only.

Mounted at the outermost portion of the left end section 41 is a wheel assembly 70. The wheel assembly 70 comprises a conventional rubber tire 71 rotatably mounted upon a substantially horizontal axle member 72. The details of such mounting are well known in the art and hence, need not be disclosed further herein. The axle member 72 is supported and carried by two vertical plates 73 and 74, having a generally L-shaped structure and connected by a horizontal top plate 75 secured to and extending between the top edges of the two vertical plates. The wheel assembly 70 further comprises a shaft member 80 and a sleeve-like housing 81 which facilitate rotation of the wheel assembly and attachment to the left end section of the supporting bar, respectively. The housing 81, which comprises a hollow shaft, is welded or otherwise secured to the forwardmost portion of the left end section 41. It is to be understood that any means of fixedly securing the housing 81 to the supporting bar 40 so as to facilitate the contemplated use is suitable for practice of the present invention. The shaft member 80 rests within the housing 81 and the base of the shaft is attached to the horizontal top plate 75 in such a manner as to permit rotation of the wheel assembly 70 about the shaft member. The details of such a rotatable mounting are well known and it is thus seen that the shaft 80 comprises a vertical axis about which the wheel assembly 70 may pivot 360° in a caster-fashion, and further allows the wheel assembly 70 to support the outer end of the left end section 41 for movement along the fairway 14.

A flexible netting 90 is carried by the supporting bar 40 by a plurality of hook and ring members 91 and 92, respectively, and extends rearwardly from the supporting bar. The netting 90 may be formed of any suitable material for conditioning the fairway, such as nylon, rope, or the like. As best shown in FIG. 3, a rope member 93 is sewn or otherwise attached to the outermost portions of the netting 90. The forwardmost section of the rope member 93 is inserted or otherwise placed within the hook members 92 so that the netting 90 is dragged behind the supporting bar 40 to engage a fairway 14. Two ring members 92 are secured to the furthermost left and right portions of the rope 93, and then placed on the outermost hooks 91a and 91b (not shown). Such an arrangement prevents entanglement of the netting 90 with the wheel assemblies 70.

A chain 94 or other like weighted member is sewn or otherwise attached to the netting 90. The chain 94 extends laterally across the width of the netting 90, and serves to insure engagement of the netting to the ground of the fairway 14. It will be appreciated by one skilled in the art that the chain 94 further insures engagement of the remaining rearward portion of the netting 90 with the ground as the netting is dragged behind the supporting bar 40 by the tractor mower 11. The chain 94 may be located on the netting approximately one-third the length of the netting from front to back so that the rear two-thirds of the netting engages the fairway, although the precise front-back location of the chain is not considered critical.

In operation of the invention, a turf conditioning apparatus is mounted upon the rear portion 12 of a conventional tractor mower 11 with the supporting bar 40 mounted in a substantially horizontal plane and extending in a lateral direction perpendicular to the direction of forward movement of the tractor mower. The netting 90 is maintained stretched out across the fairway 14 by the supporting bar 40 so as to engage the chain 94 to the fairway and thus insure ground engagement by a substantial portion of the netting. The turf conditioning apparatus 10 is then engaged to the fairway 14 by simply operating the tractor mower 11 in the conventional manner, the turf conditioning apparatus thereby being dragged across the fairway immediately behind the tractor mower. The netting 90 is sufficiently flexible and lightweight to float freely along the freshly-cut turf, breaking up clumped grass without burning or otherwise damaging the grass.

Figure 2:
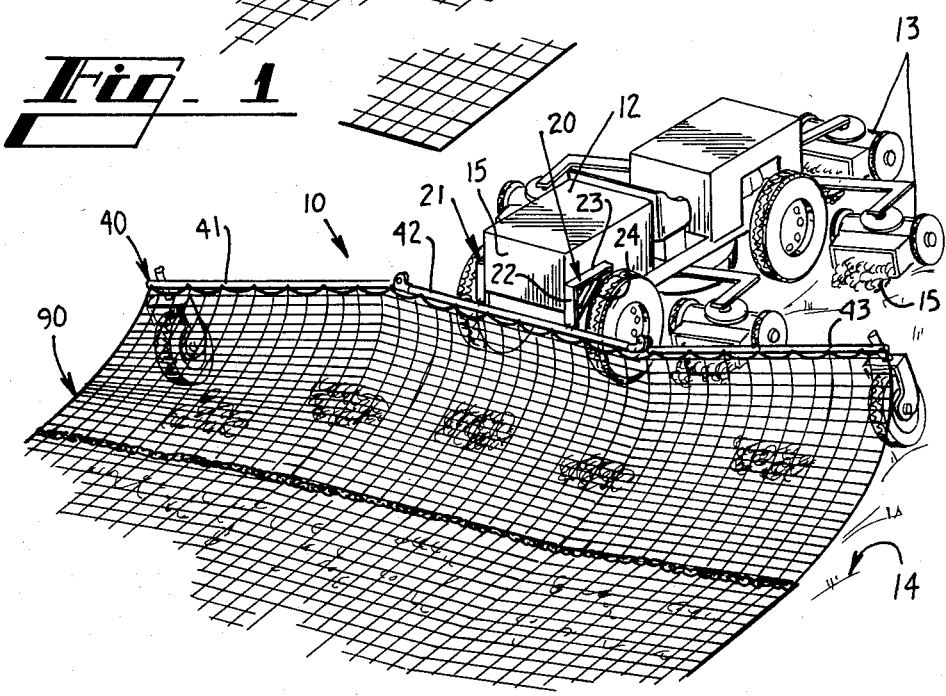
FIG. 2 is a pictorial view of the embodiment shown in FIG. 1, showing the disclosed turf conditioning apparatus traversing a contoured surface.

On a level ground surface, the apparatus 10 will appear as in FIG. 1 wherein the sections 41, 42 and 43 of the supporting bar 40 are in substantially straight line. However, when traversing a contoured ground surface, the supporting bar 40 will take on a configuration as typified in FIG. 2, wherein the two end sections 41 and 43 will float independently of the center section 42 so as to maintain contact of the netting 90 with the fairway 14. It will be appreciated by one skilled in the art that the pivotal mounting of the end sections 41 and 43 to the center section 42 facilitates this floating of the end sections. The floating operation of the apparatus insures that the netting is dragged across the full width of the fairway notwithstanding hilly or irregular terrain, and also prevents the outer ends of the supporting bar 40 from contacting the fairway as the tractor traverses uneven ground.

It is thus seen that an apparatus embodying the present invention promotes a healthy fairway. The present apparatus distributes the grass cuttings 15 evenly about the fairway 14 in a single operation with cutting the grass, thus substantially reducing operating costs of cutting the grass and providing a smooth, uninterrupted playing surface by preventing preventing any matting or clumping of the grass cuttings on the grass surface. In the same manner, divots in the fairway 14 will be smoothed over to provide a constant and firm ground surface to support the golfer. While preventing clumping, the present turf conditioning apparatus promotes stronger, healthier grass. The sweeping action of the apparatus forces the grass blades to stand up, allowing improved air circulation and providing a carpet-like appearance for the entire golf course. By eliminating the clumping of the clippings, the formation of thatch and matting is greatly reduced. The improved air circulation helps reduce the risk of Sclerotinia Homeocarpa (dollar spot) and other diseases, while promoting new growth.

It will be further appreciated by one skilled in the art that the present invention will so condition the fairway as to eliminate the need for "Winter Rules" except in circumstances of substantial injury to the fairway surface. Thus, the present invention serves to improve the quality of a golf course and therefore, increases the quality and enjoyment of a golfer's play.

It is to be understood that the present invention has various applications outside the sport of golf. For example, the present invention may be of significant value in other sports where the quality of turf is of direct import to play of the sport. Such sports include baseball, football, soccer, etc. Thus, while this invention has been described in detail with particular reference to preferred embodiments, it will be understood that variations and modifications can be effected within the spirit and scope of the invention as described hereinbefore and as defined in the appended claims.

We claim:

1. A turf conditioning apparatus for use with a tractor-mower, comprising:

a supporting bar comprising two end sections pivotally attached to a center section so that said end sections may act independently of said center section;

means for securing said supporting bar to said tractor-mower;

a flexible netting suspended from said supporting bar so as to extend therefrom, said netting defining a length from a front portion to a rear portion thereof; and weight means attached to and extending across the width of said netting in a direction substantially perpendicular to the movement of said turf conditioning apparatus, said weight means being attached to the top of said netting intermediate said front portion and said back portion and being sufficiently freely flexible across the width of the flexible netting so as to insure engagement of that portion of said netting extending rearwardly of said weight means with an undulating ground surface to be conditioned, whereby conventional operation of said tractor-mower pulls said netting across the ground surface so that at least that portion of the length of said netting extending rearwardly of said weight means traverses the contour of the ground surface so as to condition said ground surface.

2. The apparatus of claim 1 wherein said netting is suspended from said supporting bar by a plurality of hooked members secured to said supporting bar whereby one end of said netting may be inserted in said hooked members so as to carry said netting upon said supporting bar.

3. The apparatus of claim 1, further comprising means for sustaining the outermost portion of each of said two end sections a fixed distance above the ground surface, said sustaining means comprising a ground-engaging wheel assembly rotatably mounted adjacent said outermost portion of each said end section and operative along with said pivotal attachment to maintain said end sections at a fixed distance above ground as the tractor-mower traverses an undulating surface.

4. A turf conditioning apparatus for use with a tractor-mower, comprising:

a supporting bar;

means for securing said supporting bar to said tractor-mower;

netting means suspended from said supporting bar so as to extend rearwardly therefrom and come into contact with a ground surface to be conditioned, whereby conventional operation of said tractor-mower pulls said netting means across the ground surface so as to condition said ground surface, said netting means defining a length from the front portion to the rear portion thereof; and a weighted member attached to and extending across the width of said netting means in a direction substantially perpendicular to the movement of said turf conditioning apparatus, wherein said weighted member comprises a chain positioned substantially one-third the length from the front to the rear of said netting so as to insure engagement of the remaining rearward portion of said netting length with the ground surface.

5. The turf conditioning apparatus of claim 4 wherein said weighted member is secured to a top portion of said netting means so as to prevent any engagement of said chain to said ground surface, thereby insuring that said chain does not damage said ground surface.

* * * * *